UNITED STATES PATENT OFFICE.

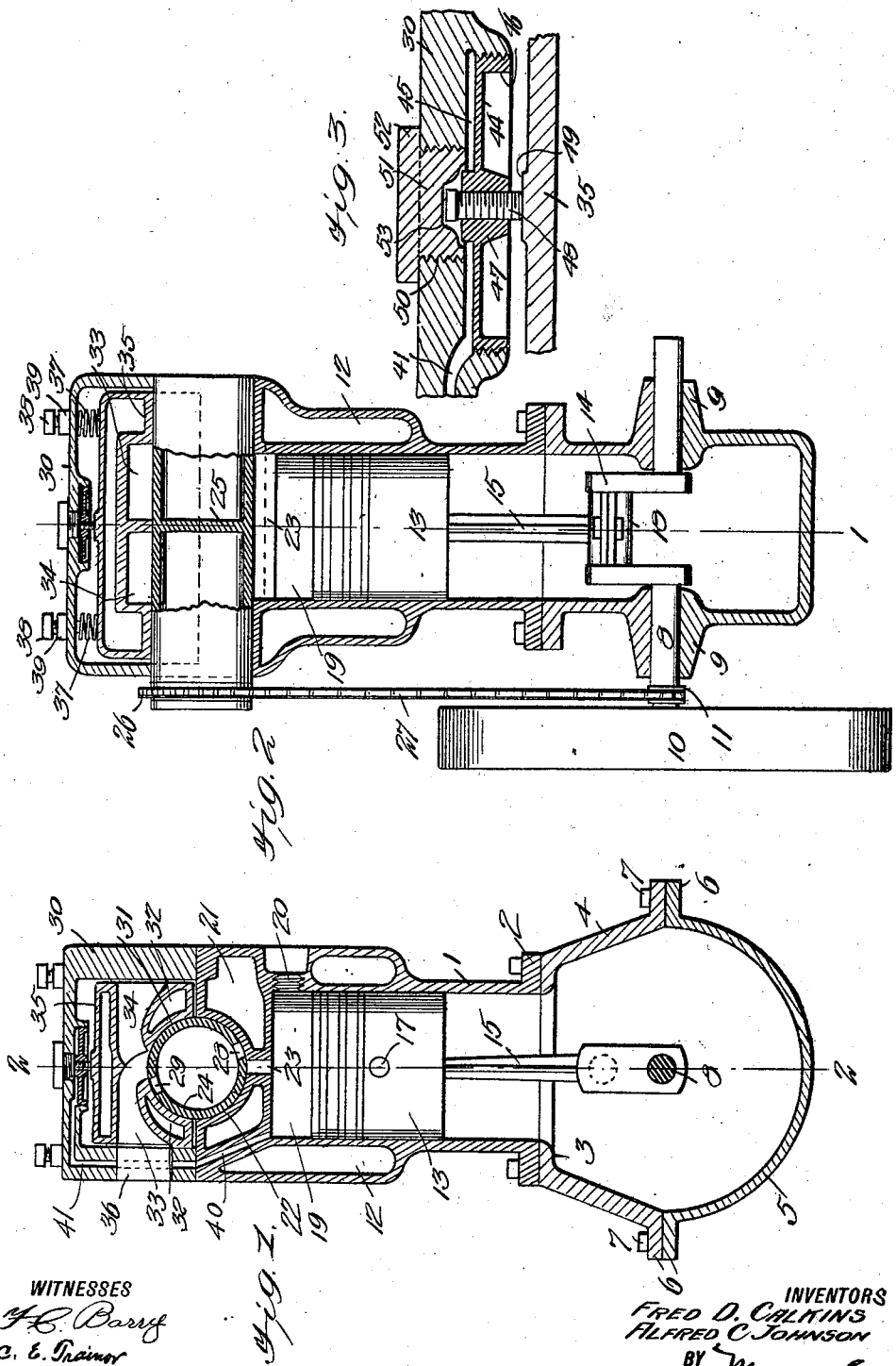

FRED D. CALKINS AND ALFRED C. JOHNSON, OF SUNNYVALE, CALIFORNIA.

INTERNAL-COMBUSTION ENGINE.

1,134,726.  Specification of Letters Patent.  Patented Apr. 6, 1915.

Application filed September 3, 1912. Serial No. 718,247.

*To all whom it may concern:*

Be it known that we, FRED D. CALKINS and ALFRED C. JOHNSON, citizens of the United States, and residents of Sunnyvale, in the county of Santa Clara and State of California, have invented certain new and useful Improvements in Internal-Combustion Engines, of which the following is a specification.

Our invention is an improvement in internal combustion engines, and has for its object the provision of means in connection with a rotary valve for controlling the admission and exhaust of the motive fluid, for holding the valve yieldingly on its seat, while permitting it to rotate, and for compensating for wear in the valve or in the seat.

In the drawings:—Figure 1 is a section on the line 1—1 of Fig. 2, Fig. 2 is a section on the line 2—2 of Fig. 1, and Fig. 3 is an enlarged detail sectional view of a portion of Fig. 1.

In the present embodiment of the invention the cylinder 1 is provided with a lateral marginal flange 2 at one end, which seats upon the flange 3 of the upper portion 4 of the crank case. The said case consists of the two portions 4 and 5, each of which is laterally flanged as shown at 6, and bolts 7 are provided for securing the flanges together.

The crank shaft 8 is journaled in the crank case in bearings 9, and outside of the crank case a fly wheel 10 is secured to the shaft. A pinion 11 is also secured to the shaft outside the crank case and between the fly wheel and the adjacent bearing 9. The cylinder is jacketed at the end remote from the crank case as indicated at 12, and a piston 13 is movable in the cylinder. The piston is connected to the crank 14 of the crank shaft by means of a piston rod 15, the said rod engaging a cross pin 17 at one end and having a sectional bearing 18 at the other end for engaging the crank of the crank shaft.

It will be noticed from an inspection of Figs. 1 and 2 that when the piston is at the end of its outward stroke, that is, when the piston is at its farthest point from the crank shaft, a space is left between the outer end of the cylinder and the adjacent end of the piston, the said space forming a combustion chamber 19. The cylinder is provided with an internally threaded opening 20 at the said chamber 19 for receiving a spark plug or the like for igniting the charge.

The outer end of the cylinder, that is, the end remote from the crank case, is provided with a double wall or jacket as indicated at 21, and on the outer face of the said end a transverse semi-circular recess or bearing 22 is provided. A port 23 that extends the full diameter of the cylinder is provided at the said outer end, the port opening from the combustion chamber 19 to the center of the bearing 22.

A hollow cylindrical valve 24 is mounted to rotate on the seat or bearing 22 and the said valve has its ends closed and is provided with a central diametrical partition 25. The valve is extended at one end beyond the cylinder, and is provided with an annular series of gear teeth 26, and a chain 27 connects the teeth with the pinion 11, before mentioned. The valve is provided with oppositely arranged series of ports 28 and 29, one of the ports of the series 28 and 29 opening on each side of the partition 25.

A cap 30 is arranged at the outer end of the cylinder, the said cap seating on the said outer end and being secured thereto in any suitable manner. The cap is hollow as shown, and a movable bearing section 35 is arranged within the said cap. The inner face of the bearing section is provided with a transverse semi-circular recess 31, which coöperates with the recess 22 to form a bearing or valve chamber for the rotary valve 24. It will be noted that that portion of the bearing section adjacent to the recess 31 is double walled or jacketed as indicated at 32, and that passages 33 and 34 lead from the recess 31 to opposite sides of the bearing section, the passage 33 opening at one side and the passage 34 at the opposite side. The cap 30 is provided with ports for registering with the passages 33 and 34, but one of the said ports, that coöperating with the passage 33, being shown, the said port being designated at 36.

The movable bearing section 35 is movable toward and from the fixed section at the end of the cylinder, and springs 37 are arranged between the outer face of the said bearing section and the inner face of the cap 30. A screw 38 engages each spring 37 for varying the tension thereof, each screw being threaded through a threaded boss 39 in the cap. The springs 37 hold the bearing section 30 firmly in contact with the rotary valve 24, while at the same time, permitting the said bearing section to yield.

It will be noted from an inspection of Fig. 1 that the movable bearing section 35 does not fit closely against the outer face of the outer end of the cylinder, a sufficient space being left to permit the movable bearing section to move toward the fixed section to compensate for wear.

The fixed section of the bearing, that is, the outer end of the cylinder, is provided with a longitudinally extending inclined passage 40, which at its outer end registers with the passage 41 in the wall of the cap 30, and the said passage 41 (Fig. 3) extends into the cap placing the space between the movable bearing section and the cap in communication with the combustion chamber of the cylinder. At the point where the passage 41 opens into the cap, it is enlarged to form a recess 45. A diaphragm 44 is arranged transversely of the passage 41 at the recess 45, the said diaphragm having a lateral marginal flange 46, which is externally threaded and engages the recess, to permit the diaphragm to be attached and removed.

The diaphragm 44 is provided with a central internal threaded hub or boss 47, and a screw 48 is threaded through the boss. The inner end of the screw engages an enlargement 49 on the outer face of the outer end of the movable bearing section, and the cap 30 is provided with an internally threaded transverse opening 50, at the outer end of the screw 48. A plug 51 is threaded into the opening 50, the said plug having a flange 52 fitting against the outer face of the cap 30 and the inner end of the plug is recessed as indicated at 53 to provide room for the head of the screw.

The passages 40 and 41 open on the outer face of the diaphragm 44, so that the pressure of the combustion chamber 19 may pass to the outer face of the diaphragm.

It will be evident that during the explosion of a charge the outward pressure is greatest on the valve, and at this time, a greater tension is needed on the movable bearing section than at any other time. It is impossible to regulate a spring so that it would furnish the proper degree of tension when required. The provision of the diaphragm however and the passage that permits the pressure from the combustion chamber to engage the outer face of the diaphragm perfectly regulates the pressure on the movable section of the bearing. During the explosion, the diaphragm is supported from the outer side, thus holding the valve firmly in place, while when the pressure is relaxed in the combustion chamber, the pressure is also relaxed on the movable section of the bearing.

The provision of the diaphragm which carries the screw bearing against the movable section of the bearing and the passage for permitting the pressure from the combustion chamber to act on the outer face of the diaphragm, provides a tension that automatically increases when the pressure on the valve increases, and decreases when the pressure on the valve relaxes.

The springs furnish what may be termed a coarse adjustment, being more especially adapted to compensate for wear, while the diaphragm furnishes an automatic adjustment that varies with the pressure on the valve, always furnishing just the exact amount of resistance necessary and no more. The piston is provided with the usual packing rings 54.

In operation, the charge is prepared and admitted to the engine in any suitable manner. When the port 29 registers with the passage 33, a port 28 on the same side of the partition 25 will register with the port 23. In Fig. 1 the port 29 is on the point of registering with passage 33 and the port 28 with port or passage 23. As soon as this occurs, the piston commences to move toward the crank shaft and the charge is drawn into the combustion chamber. On the return stroke of the piston all of the ports are closed and the charge is compressed. As the piston starts again toward the crank shaft the charge is ignited, and the piston is drawn downward on its working stroke. As it commences its return stroke, the passages 28 and 29 on the opposite side of the partition 25 are in register with ports or passages 23 and 34 respectively, thus permitting the products of combustion to be exhausted.

We claim:—

1. An engine of the character specified, comprising a cylinder having one of its ends open and having at its opposite end a transverse approximately semi-circular recess and a diametrical port leading from the interior of the cylinder to the recess, a crank case at the open end of the cylinder, a crank shaft in the crank case, a piston in the cylinder, a rod connecting the piston with the crank of the crank shaft, said cylinder having a combustion chamber between its outer end and the outer end of the piston when farthest from the crank shaft, a cap seated on the outer end of the cylinder, a movable bearing section in the cap, said bearing section having on its inner face a transverse approximately semi-circular recess coöperating with the recess of the cylinder end to form a cylindrical bearing, a hollow rotating cylindrical valve in the bearing, said valve having a transverse central partition and having oppositely arranged ports on each side of the partition, a driving connection between the crank shaft and the valve for rotating the said valve, said movable bearing having passages adapted to register with the ports of the valves, springs between the cap and the movable bearing section, means for regulating the tension of the springs, said cap having an internally threaded approximately circular recess on its inner face, a diaphragm threaded into the recess, a set screw threaded through the diaphragm and engaging the movable bearing section, said cap and cylinder having registering passages for placing the combustion chamber in communication with the recess behind the diaphragm, the cap having an opening coaxial with the screw, and a plug threaded into the opening for closing the same.

2. An engine of the character specified, comprising a cylinder having one of its ends closed and provided with a transverse bearing section, a cap seated on the said end of the cylinder, a movable bearing section in the cap, a rotatable valve held between the bearing sections, springs between the cap and the movable bearing section, said cap having a central circular internally threaded recess, approximately co-axial with the cylinder, a diaphragm threaded into the recess, a screw threaded through the diaphragm and engaging the movable section, said cap and cylinder having registering passages for placing the combustion chamber of the engine in communication with the recess behind the diaphragm, the cap having an opening at the screw, and a plug normally closing the opening.

3. An engine comprising a cylinder having its outer end closed and transversely recessed to form the fixed inner half of a cylindrical valve chamber, a cap seated on the said outer end, a movable bearing section forming the outer half of the valve chamber in the cap, said bearing section having a transverse recess coöperating with the recess of the cylinder to form a cylindrical valve chamber, a cylindrical valve in the chamber, springs pressing the movable section of the chamber toward the cylinder, and means for regulating the tension of the springs.

4. An engine comprising a cylinder having its outer end closed and transversely recessed to form the fixed inner half of a cylindrical valve chamber, a cap seated on the outer end, a movable bearing section forming the outer half of the valve chamber in the cap, said bearing section having a transverse recess coöperating with the recess of the cylinder to form a cylindrical valve chamber, a cylindrical valve in the chamber, and yielding means pressing the sections of the chamber toward each other.

5. An engine comprising a cylinder having its outer end closed and transversely recessed to form the fixed section of a cylindrical valve chamber, a cap seated on the said outer end, a movable bearing section in the cap, said bearing section having a transverse recess coöperating with the recess of the cylinder to form a cylindrical valve chamber, a cylindrical valve in the chamber, said cap having a recess in alinement with the axis of the cylinder, a diaphragm detachably held in the recess, said cap and cylinder having registering passages for placing the combustion chamber of the cylinder is communication with the recess behind the diaphragm, and a screw threaded through the diaphragm and engaging the movable section, said cap having a means for permitting access to the screw.

6. An engine comprising a cylinder having its outer end closed and transversely recessed to form the fixed section of a cylindrical valve chamber, a cap seated on the said outer end, a movable bearing section in the cap, said bearing section having a transverse recess coöperating with the recess of the cylinder to form a cylindrical valve chamber, a cylindrical valve in the chamber, said cap being recessed on its inner face and in alinement with the axis of the cylinder, a diaphragm in the recess, said cap and cylinder having registering passages for placing the combustion chamber in communication with the recess behind the diaphragm, means held by the diaphragm and engaging the movable section, said means being adjustable with respect to the diaphragm.

7. An engine comprising a cylinder having one end closed, a cap seated on the closed end, a movable bearing section in the cap, the closed end of the cylinder being shaped to form the coöperating fixed bearing section, a valve rotatable in the bearing, said cap having a recess in alinement with the axis of the cylinder, a diaphragm detachably held in the recess, the cap and cylinder having registering passages for placing the combustion chamber of the cylinder in communication with the recess behind the diaphragm, and a screw threaded through the diaphragm and engaging the movable section.

8. An engine comprising a cylinder having one end closed, a cap seated on the closed end, a movable bearing section in the cap, the closed end of the cylinder being shaped to form the coöperating fixed bearing section, a valve rotatable in the bearing, said cap having a recess in alinement with the axis of the cylinder, a diaphragm detachably held in the recess, the cap and cylinder having registering passages for placing the combustion chamber of the cylinder in communication with the recess behind the diaphragm, and means adjustable transversely of the diaphragm for engaging the movable bearing section.

9. An engine comprising a cylinder having one end closed, a cap seated on the closed end, a movable bearing section in the cap, the closed end of the cylinder being shaped to form the coöperating fixed bearing section, a valve rotatable in the bearing, said cap having a recess in alinement with the axis of the cylinder, a diaphragm detachably held in the recess and engaging the movable section, the cap and cylinder having registering passages for placing the combustion chamber of the cylinder in communication with the recess behind the diaphragm, springs between the cap and the movable section, and means for varying the tension of the springs.

10. An engine comprising a cylinder having one end closed, a cap seated on the closed end, a movable bearing section in the cap, the closed end of the cylinder being shaped to form the coöperating fixed bearing section, a valve rotatable in the bearing, said cap having a recess in alinement with the axis of the cylinder, a diaphragm detachably held in the recess and engaging the movable section, the cap and cylinder having registering passages for placing the combustion chamber of the cylinder in communication with the recess behind the diaphragm, and yielding means between the cap and the movable section.

11. An engine comprising a cylinder having one end closed, a cap seated on the closed end, a movable bearing section for a valve in the cap and spaced from the outer end of the said cap, the closed end of the cylinder being shaped to form the coöperating bearing section, a valve rotatable in the bearing, the cap and cylinder having registering passages leading from the combustion chamber of the cylinder to the space between the cap and the movable bearing section at the opposite side of the movable section from the cylinder, a diaphragm arranged transversely of the passage of the cap and having means for engaging the movable bearing section, said means being adjustable laterally with respect to the diaphragm.

12. In an engine, the combination with the cylinder, of a cylindrical valve chamber at the outer end of the cylinder, a valve rotatable in the chamber, said chamber being composed of inner and outer halves spaced apart from each other, the inner half being connected to the cylinder, a cap seated on the cylinder and inclosing the outer half, springs between the said outer half and the cap, and means for varying the tension of the springs.

13. In an engine, the combination with the cylinder, of a cylindrical valve chamber at the outer end of the cylinder, a valve rotatable in the chamber, said chamber being composed of inner and outer halves spaced apart from each other, the inner half being connected to the cylinder, a cap seated on the cylinder end inclosing the outer half, and yielding means between the cap and the outer half.

14. In an engine, the combination with the cylinder, of a cylindrical valve chamber at the outer end of the cylinder, a valve rotatable in the chamber, said chamber being composed of sections spaced apart from each other, one of the said sections being connected to the cylinder, a cap seated on the cylinder and inclosing the other section, said cap having a recess in alinement with the axis of the cylinder, a diaphragm detachably connected to the cap transversely of the recess, said cap and cylinder having registering passages for placing the combustion chamber of the cylinder in communication with the recess behind the diaphragm, and means in connection with the diaphragm and adjustable transversely thereof for engaging the movable section.

15. In an engine, the combination with the cylinder, of a valve chamber at the outer end of the cylinder, a valve in the chamber, said chamber being composed of inner and outer halves spaced apart from each other, the inner half being connected to the cylinder, a cap inclosing the outer half, and yielding means between the cap and the said outer half.

16. In an engine, the combination with a cylinder, of a valve chamber at the outer end thereof, a valve in the chamber, said chamber being composed of inner and outer halves spaced apart from each other, the inner half being connected to the cylinder, a cap inclosing the outer half, and a connection between the combustion chamber of the cylinder and the space within the cap between the cap and the outer half.

FRED D. CALKINS.
ALFRED C. JOHNSON.

Witnesses:
EMIL W. SNYDER,
EDW. D. DEVINE.

Copies of this patent may be obtained for five cents each, by addressing the "Commissioner of Patents, Washington, D. C."